Nov. 3, 1970

D. A. KELLY 3,537,256

ROTARY STIRLING ENGINE WITH TWO THERMAL SECTIONS AND
PHOTO HEAT SOURCE

Filed Aug. 27, 1968

INVENTOR.
Donald A. Kelly

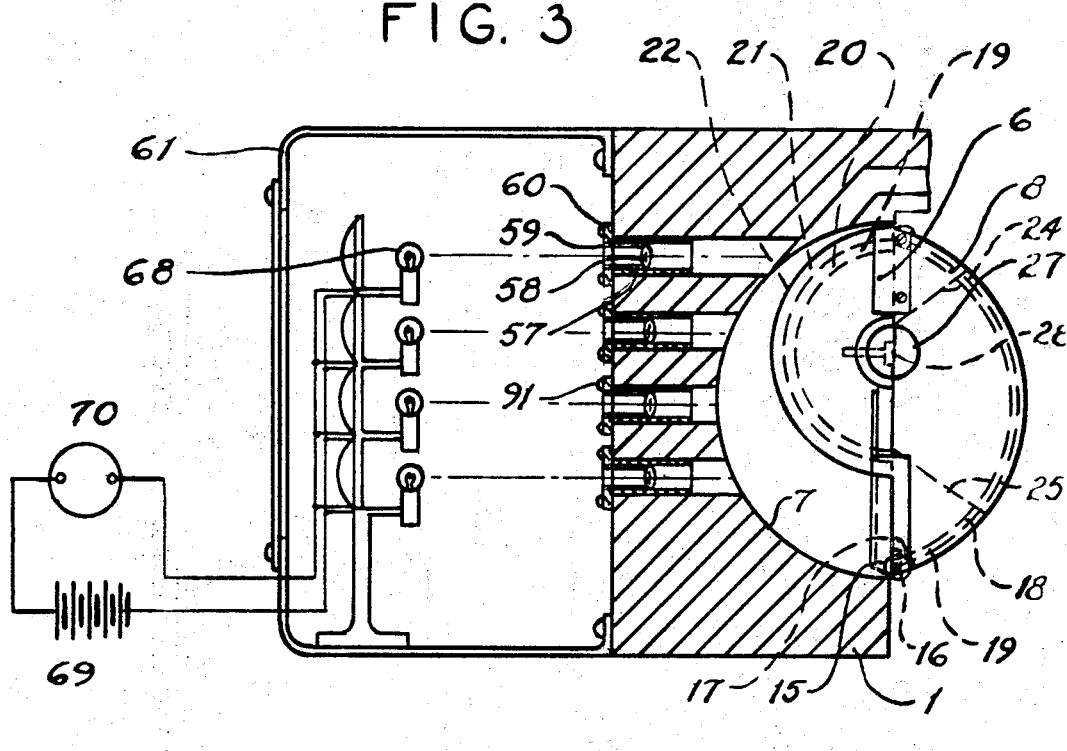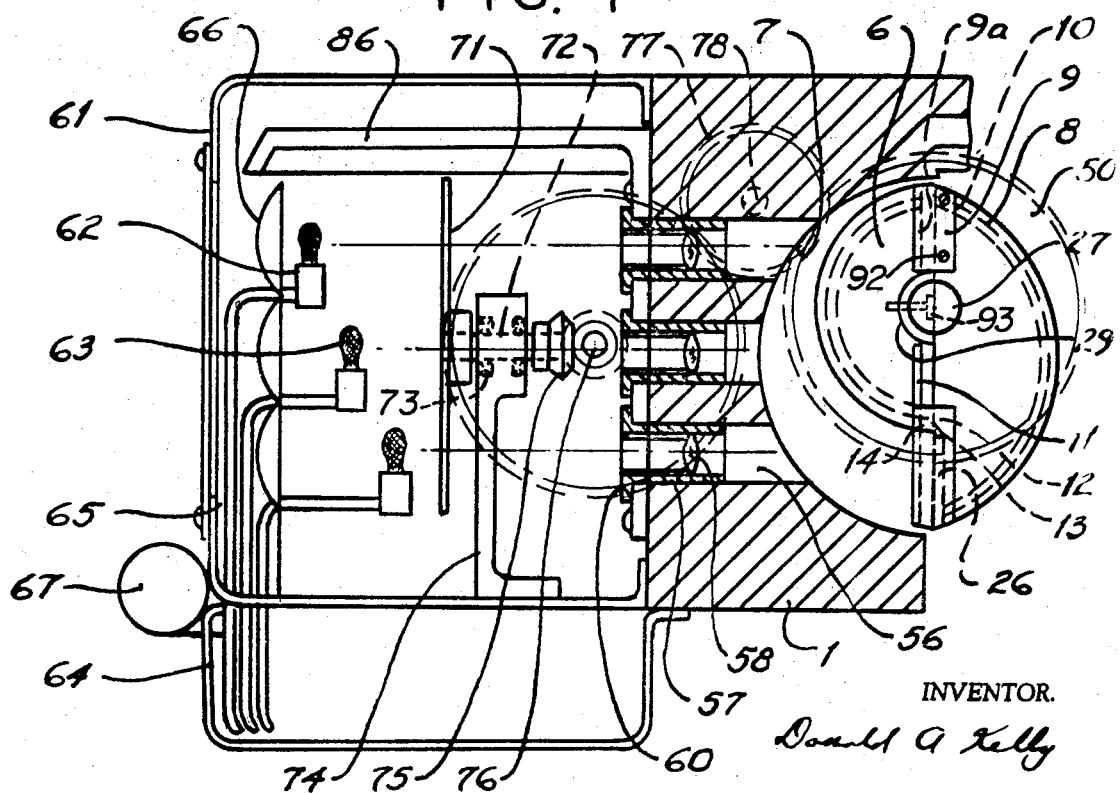

Nov. 3, 1970  D. A. KELLY  3,537,256
ROTARY STIRLING ENGINE WITH TWO THERMAL SECTIONS AND PHOTO HEAT SOURCE
Filed Aug. 27, 1968  3 Sheets-Sheet 3

INVENTOR.
Donald A Kelly

United States Patent Office 3,537,256
Patented Nov. 3, 1970

3,537,256
ROTARY STIRLING ENGINE WITH TWO THERMAL SECTIONS AND PHOTO HEAT SOURCE
Donald A. Kelly, 58—06 69th Place,
Maspeth, N.Y. 11378
Filed Aug. 27, 1968, Ser. No. 755,755
Int. Cl. F03g 7/06; F25b 9/00
U.S. Cl. 60—24                                    10 Claims

ABSTRACT OF THE DISCLOSURE

The rotary Stirling engine comprises two simple eccentric rotor and vane assemblies with interconnecting gas flow paths. The modular housing is split so that one portion connects the hot valves of both rotor assemblies, and the remaining housing portion connects the cold valves of both rotor assemblies.

The heating source consists of optically transmitted heat directed into the hot displacer gas volume over a large area for maximum effectiveness.

The photo heat source would be powered by liquid fuel or in certain cases by electrical projection lamps.

This invention relates to a pressurized rotary Stirling cycle engine with improved thermal distribution by two extended, separate housing blocks. The arrangement is modification of prior rotary Stirling engine art with the same basic components and gas flow paths. The salient difference in this engine design is that the hot and cold engine block volumes are increased and the distribution optimized to increase overall operating effectiveness and economy.

Since one of the major problems in closed cycle engine art is the effective transmission of heat into the engine hot side, it is proposed to project multiple increments of heat directly into the cylinder as a additional heating means. The normal heating by conduction would be employed with the photo means providing a necessary increase in the operating heat level.

The source for the light means would be liquid fueled minature lanterns with replaceable mantles. This arrangeis advantageous since the liquid fuel would be used for the standard heating burners for the primary heating means.

Some applications may utilize multiple minature projection lamps with an electrical battery source, since a large number of lamps and projection bores can be allowed for a given engine hot side area. This arrangement is not particularly economical since a large battery source and alternator is required and lamp life is relatively short.

It must be noted that the projection bores and lens must not focus into the cold displacer side when the displacer member revolves.

The effectiveness of the light transmitted heat in a rotary engine is considerably more complicated than in a reciprocating engine since the hot displacer side changes its position as the rotor revolves. Since the advantages of a true rotary closed cycle engine are so numerous, the approach to overcome the relationship difficulty should be done by adopting heat collection and staggered regeneration techniques. It is of prime importance to maintain the highest possible delta temperature between the hot and cold displacer sides and this end will be served by heat collection and regeneration means.

The sliding displacer member will contain multiple, circular regenerator bores and a filament collection pad at the hot end. The base rotor will also contain multiple circular regenerator bores which are staggered across the rotor width in relation to the sliding displace regenerato bores. Entrance and exit slots and bores must be provided in the displacer member to allow gas passage for the base rotor regenerator bores.

To collect and store the photo to heat focused on the base rotor it is necessary to expose the filament within the regenerator bores by slots cut into the bores for the periphery of the rotor. To isolate the stored heat when the rotor passes into the cold side it is necessary to cover the filament with sealed curved optical glass.

In operation the hot and cold gases are stored as each rotor half revolves 180 degrees and released into the half in which they were received: thus the heated filament in the hot displacer half releases the hot gas thereby heated, when the rotor has revolved 180 degrees.

The convex lens assemblies would consist of insulated housings which closely fit into the projection bores and are retained by outside flanges. The lense must be insulated from the metal block so that they are not subjected to the heat level of the hot side. The lens is sealed and retained within the insulated housing by a threaded sleeve, and a metal grid assembly may be placed on the outside of the lens to provide a backup support against the internal engine pressure. The grid elements must be thin so that the light beam is not substantially interrupted. A further variation in this engine design is that the hot bores from the displacer bore to the power bore may be uniformly tapered to provide a compression effect for reaching a higher pressure within the power bore.

The displacer rotor assembly consists of an eccentric base rotor in near tangent contact within the displacer bore. A larger semic-circular sliding displacer member is slidably mounted to the base rotor. Since the diameter of the displacer rotor is slightly smaller than the diameter of the displacer bore it must reciprocate or slide in order to follow the contour of the displacer bore for each revolution. The displacer member must contain anti-friction bearings which would contact the displacer bore.

Guide angles would be secured to the displacer member which would fit into corresponding slots in the base half rotor. Ball bearings would be recessed into the faces of the base half-rotor to contact and closely guide the legs of the guide angles so that the displacer member slides at a constant distance from the rotor center.

The displacer member would be dynamically balanced and as lightweight as possible to keep vibration to a minimum. Vibration must be kept as low as possible so that bearing, seal and other critical element life is not unduly shortened.

It will be noted that a variable crescent-shaped volume results as the displacer member revolves within the displacer bore, in all positions other than top dead center. Several pivotable vanes may be added at the periphery of the displacer member to aid in gas flow during rotation. The vane pivots must be arranged to clear the regenerator bores within the displacer member.

All the regenerator bores are provided with fine mesh filament to implement heat storage while minimizing gas flow resistance. In operation the filament would pick up heat as the displacer member and base rotor sweeps into and through the hot section for 180 degrees and release it as the entering cool gas then pushes it through into the hot zone.

The power rotor which is also eccentrically placed within the power bore would be fitted with about six or eight independently sealed vanes which should be lightly spring loaded. The independent vanes for the power rotor would have advantage of not requiring that the individual seals be spring loaded as in other vane designs.

The hot block volume would connect the hot displacer half and the hot power half, with these two zones linked together by the section above the tangency line of both bores. The hot block volume would thereby form a rectangular cavity into which the cold block would be closely fitted. The two volumes would be suitably insulated from each other so that thermal losses are minimized. The two blocks would be connected by multiple insulated bolts.

With this configuration the hot transfer bores will be entirely in the hot block volume and the cold transfer bores entirely in the cold block volume, so that the thermal sections are extended for greater effectiveness.

As in the previous rotary Stirling engines the displacer rotor and vanes takes the place of the displacer piston of the reciprocating engine, and the power rotor and vanes substitutes for the power piston. All the advantages of a true rotary engine are evident including fewer and simpler operating parts and uni-inertia, and since the dual rotor operaiton is continuous there is no phasing requirement between the stages.

It is fairly reasonable to project from this stage of design concept that this newest rotary Stirling cycle engine will surpass the current gas turbines in economy of operation, initial and operating cost and possibly in power-to-weight ratio.

In this radial flow or parallel bore arrangement the hot expanding gases are centrifugally directed by the rotating displacer member into the power stage where they cause the power vanes to rotate.

The basic heat source will be applied at the hot displacer side and will move across to the power bore side by conduction. A heat conducting hood is placed over the miniature lanterns to conduct heat to the hot block.

The parallel cooling bores will be uniformly disposed in the cold block and arranged to clear the cold transfer bores. The two end plates would be provided with holes which line up with the corresponding coolant holes with gaskets fitted to assure an adequate seal at these surfaces. Two coolant manifolds would be secured to the end plates so that coolant would be circulated through a maximum surface area at the cold block of the engine.

The engine, as a closed cycle machine, must be provided with a high temperature dry film lubricant and anti-friction seals so that no internal circulating oil system will be required. Effective long-life dry lubrication is of major importance to the efficient operation of the engine.

It is possible that a light interrupting half-disc may have to be utilized in order to prevent heat from entering and contacting the displacer member when the major solid volume is in the hot displacer volume.

The half-disc would allow light to enter the displacer volume during the heating phase and would be coupled to the displacer shaft with a 1:1 ratio drive arrangement.

It is an object of the invention to achieve a simple and efficient rotary Stirling engine at a minimum cost.

It is an object of the invention to achieve a simple rotary Stirling engine which reaches high efficiency by special heating and cooling techniques.

It is an object of the invention to produce a rotary Stirling engine which operates on dry film lubricants with no fluid lubrication required.

It should be understood that variations may be made in the detail design of the engine without departing from the spirit and scope of the invention.

Referring to the drawings:

FIG. 3 is a front section through the hot side of the engine and heating means.

FIG. 4 is a front section through the hot side of the engine and alternator heating arrangement.

Figure 1:
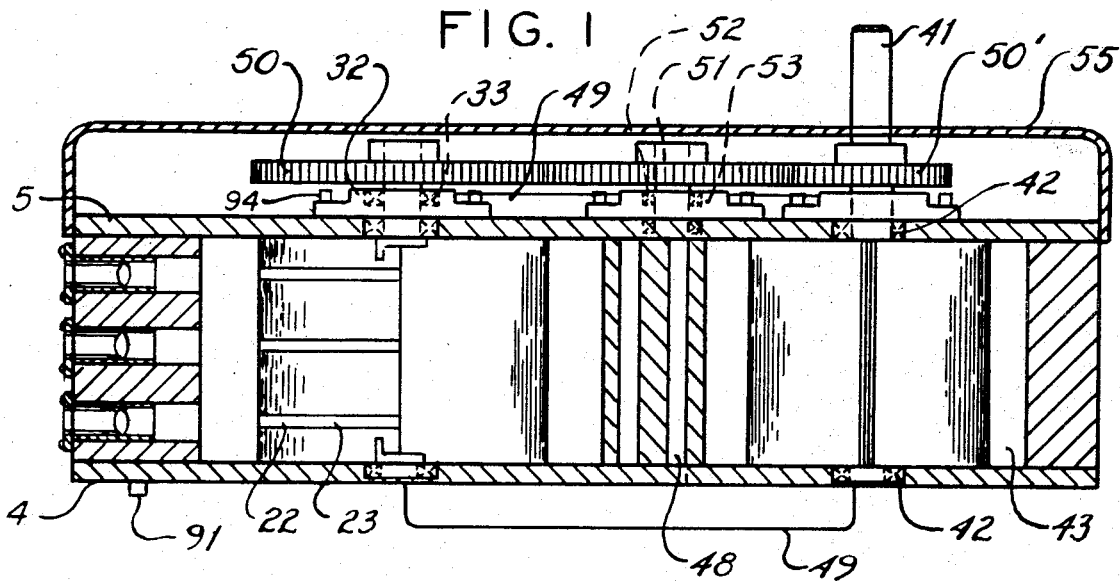
FIG. 1 is a top section through the engine.
Figure 2:
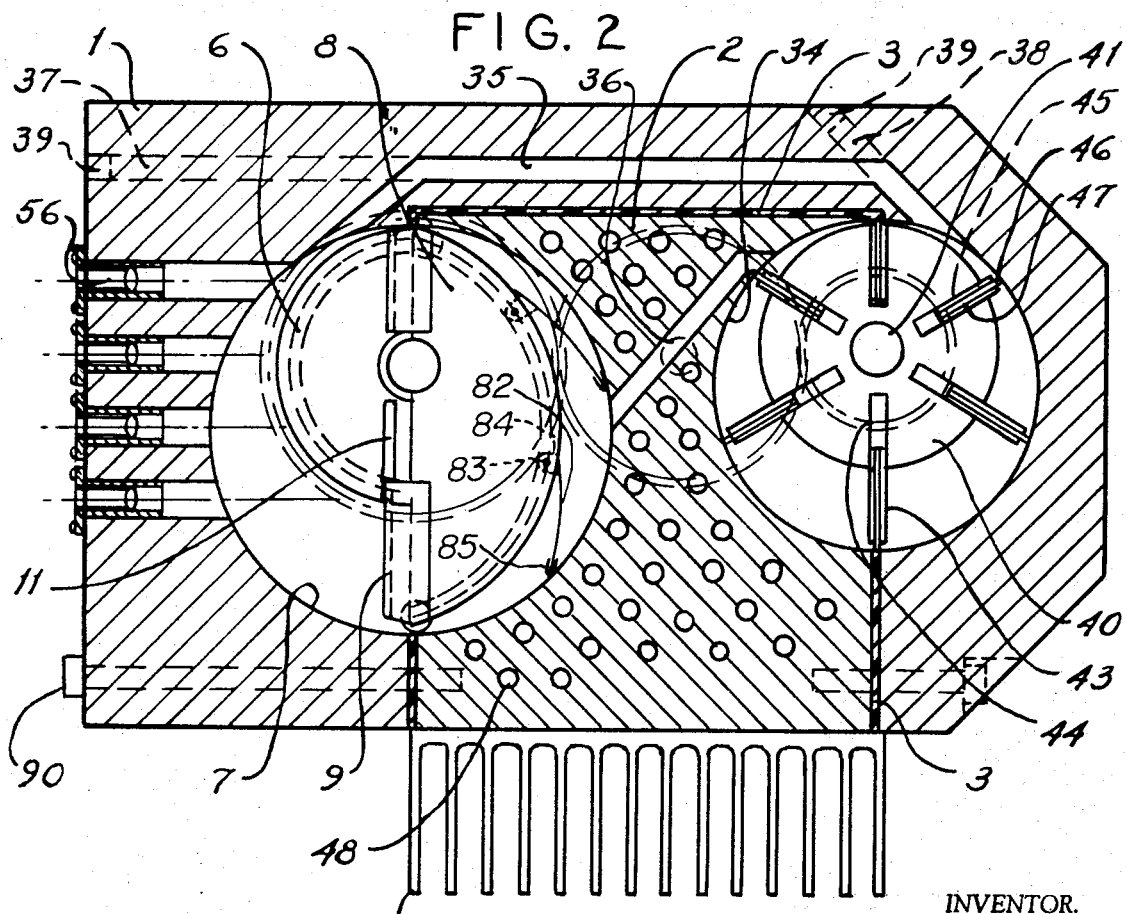
FIG. 2 is a front section through the engine.
Figure 5:
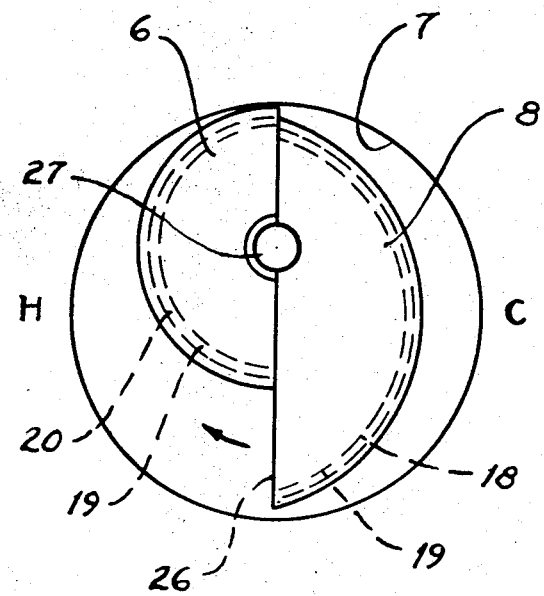
FIG. 5 is a phase diagram of the displacer member within the displacer bore—hot expansion phase.
Figure 6:
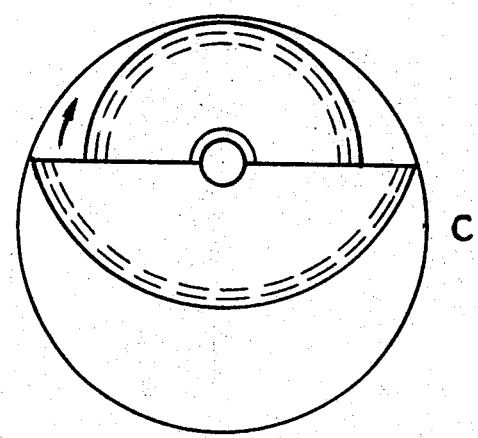
FIG. 6 is a phase diagram-mid position-hot to cold gas flow.
Figure 8:
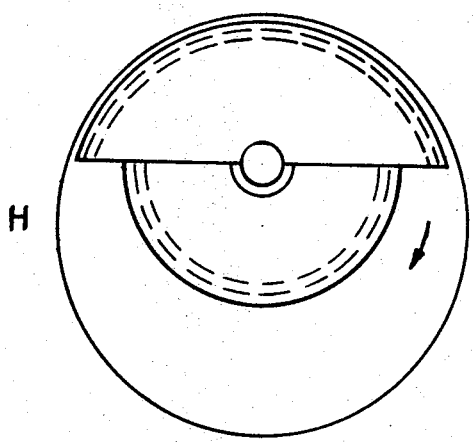
FIG. 8 is a phase diagram-mid position-cold to hot gas flow.
Figure 7:
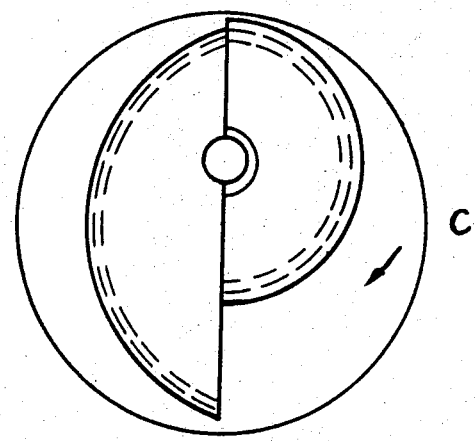
FIG. 7 is a phase diagram-cold contraction phase.

Referring to the drawing in detail:

The engine module consists of a hot housing block 1 and cold housing block 2 which are insulated from each other by the insulators 3. The two housing blocks are secured together by the insulated bolts 90. The front plate 4 and the rear plate 5 are secured to the engine module by the screws 91.

The displacer base half-rotor 6 is offset within the displacer bore 7 and is set at near tangent contact at the upper end. The sliding displacer member 8 is near semicircular in shape having a diameter which is slightly less than the displacer bore 7 diameter, and a height equal to the base half-rotor 6 radius. The displacer member 8 is provided with two guide angles 9 secured in the steps 10 within the base half rotor 6 with the screws 92. Corresponding slots 11 are located in the base half-rotor 6 into which the guidance legs 9a of the guide angles 9 fit with slight clearance.

Ball bearings 12 and pins 13 are recessed into the bores 14 within the base half-rotor 6 to engage and guide the guidance legs 9a of the guide angles 9, and thereby allow the displacer member to slide back and forth at a fixed distance from the center.

Guidance bearings 15 and pins 16 are recessed into the slots 17 at the ends of the displacer member 8, so that the displacer member freely rolls around within the displacer bore 7 at a constant close clearance.

Multiple circular regenerator bores 18 are uniformly arrayed within the displacer member 8, with fine regenerator filament 19 uniformly dispersed within the regenerator bores 18.

Multiple circular regenerator bores 20 are uniformly arrayed within the base half-rotor 6, with fine regenerator filament 19 uniformly dispersed within the regenerator bores 20.

Exposure slots 21 are cut directly into the regenerator bores 20 to collect the photo heat, and curved glass strips 22 are bonded into the grooves 23 above the exposure slots 21. The regenerator bores 20 within the base half-rotor 6 must be staggered in relation to the regenerator bores 18 within the displacer member 8, and therefore entrance slots 24 and exit slots 25 must be located in the displacer member 8.

A filament collection pad 26 is located at the hot end of the displacer member 8, which is in contact with the slots 25, in order to collect and transmit heat to the gas during the heating phase.

The rotor shaft 27 must be provided with a diametral notch 28 in order that the displacer member 8 may slide on the flat surface of the base half-rotor 6. The rotor shaft 27 must also be provided with a torque half-flange 29 which may be welded to the output end of the shaft. The rotor shaft 27 would be secured to the base half-rotor 6 with the screws 93, along the notch 28 and through the torque half-flange 29. The torque half-flange 29 must be mounted flush into the recess 30 within one end of the base half rotor 6.

The two rotor bearings 31 support the base half-rotor 6 and rotor shaft 27 within the engine module and the end plates 4 and 5.

The retaining flanges 32 support the shaft seals 33 which pressure seal the shafts in the engine module. The retaining flanges 32 are secured to the rear plate 5 with the screws 94, with a suitable sealant used to make a pressure tight seal between the retaining flanges, 32 and the rear plate 5.

The power bore 34 is located at the opposite end of the engine module and is connected to the displacer bore 7 by the multiple hot transfer bores 35 and the multiple cold transfer bores 36. The hot transfer bores 35 are entirely in the hot housing block 1, while the cold transfer bores 36 are located entirely in the cold housing block 2.

The entrance bores 37 and 38 are sealed with the threaded plugs 39. The hot and cold transfer bores 35 and 36 are offset from each other so that these bores do not intersect.

The power rotor 40 closely fits and revolves in the power bore 34 and is supported by the output shaft 41. The two rotor bearings 42 support the power rotor 40 and the output shaft 41 within the engine module and plates 4 and 5. The multiple power vanes 43 are closely fitted into corresponding slots 44 within the power rotor 40 and have free radial movement within the slots. The power rotor 40 has a through bore into which the output shaft 41 is fitted.

The power vanes 43 are provided with slots 45 at the ends and along the sides into which the rectangular seals 46 and 47 are closely fitted. The sealing arrangement for each vane consists of one long rectangular strip 46 along the top of the vane and two short seal strips 47 along the side. The ends of the adjacent seals are half-lapped so that they interlock to form a continuous sealing surface.

The cold housing block 2, contains the multiple liquid coolant holes 48 axially arranged around the two bore portions and uniformly distributed in the block 2. The holes 48 must be quite closely spaced to insure that a sufficient volume of coolant passes through the cold housing block 2. Two manifolds 49 must be placed over all the cooling holes 48 at either side of the engine to distribute and collect the coolant as it is pumped through the system.

Three meshing spur gears 50' are secured to the output shafts 27 and 41 and the idler shaft 51. This arrangement allows the two stages to rotate at different speeds and in the same direction so that the cycle may function ideally.

The idler shaft 51 is supported by the two bearings 52 and flange 53. The flange 53 is secured to the rear plate 5 by the screws 94. The gears are locked on their respective shafts by the pins 54. A snap-on cover 55 encloses the gear assembly to provide dirt exclusion and protection for these components.

The hot housing block 1 is provided with multiple photo bores 56 which are uniformly placed on the hot side wall and enter the displacer bores 7. A lens assembly consisting of a housing 57 into which a convex lens 58 is fitted and retained by a sleeve 59, is provided for each photo bore 56. The housing 57 has an outside flange 60, which is required to mount and seal the housing against the housing block 1. The screws 91 are used to clamp the flange 60 of the housing to the housing block 1.

The projection housing 61 contains the multiple burner nozzles 62 and mantles 63, which are connected to the fuel tank 64 by the fuel tubes 65. Each burner nozzle 62 has a reflector 66 behind it, which beams the light into the photo bores 58. The convex lens 58 focusses the light beam onto the base half-rotor 6. A heat collection hood 86, is secured to the hot block 1.

A suitable pump 67 is connected to the fuel tank 64 to provide the pressure for fuel delivery to the burner nozzles 62. The burner nozzles 62 without the mantles 63 are also used to heat the hot housing block 1 directly as the basic heat source.

In the alternate photo heating arrangement, electric projection lamps 68 are substituted for the liquid fuel burners, and receive electricity from the batteries 69. An engine driven alternator 70 must be employed to recharge the batteries. A light-interrupting arrangement may be employed to supplement the rotor thermal system. The light-interrupting half-disc device would prevent the light-beamed/heat from overheating the curved portion of the displacer member which would be detrimental to the cooling phase as the displacer member enters the cool displacer bore half.

A light-interrupting half-disc 71 may be used in conjunction with the photo heat arrangement. The light-interrupting half-disc 71 would be placed between the burner nozzle light sources 62 and 63 and the hot housing block 1 so that the light beams may be stopped for ½ revolution when the displacer member is in the cooling phase.

A shaft 72 and bearings 73 support the half-disc 71 within the bracket 74, which is secured to the projection housing 61. A gearing arrangement consisting of a mitre gear set 75 and shaft 76 connects the half-disc 71 to the idler gear 77 and idler shaft 78 through the gear 79. The idler gear 77 meshes with one of the spur gears 50 mounted on the rotor shaft 27, to complete the gear train. The half-disc 71 is phased with the displacer member so that the light is blocked when the displacer member is in the hot gas volume.

One of several curved, pivotable vanes 82 may be provided on the curved portion of the displaced member 8 to aid in the gas flow. The lightweight vanes 82 must be thin enough to pass through the top dead center position or the rotor center dropped to provide the necessary clearance. The pivot pins 83 would be pivotable within the lugs 84 secured to, or integral with the periphery of the displacer member. Low friction lips 85 must be secured to the ends of the vanes 82 to take the wear in operation. The vanes 82 need not be a close fit within the displacer bore 7, since compression is not necessary.

What is claimed is:

1. A pressurized gas rotary Stirling cycle engine comprising a channel-shaped hot housing block, a rectangular-shaped cold housing block fitted within the said channel-shaped hot housing block, insulation means disposed between the said hot and cold housing blocks, two large parallel bores uniformly disposed within both said hot and cold housing blocks, multiple small bores disposed at right angles to the said large bores which freely communicate with the said two large parallel bores to form a continuous gas circuit, a base half-rotor eccentrically disposed in one of the said large parallel bores, a near half-round displacer member in sliding association with the said base half rotor, bearing and guidance means for the said near half-round displacer member, circular regeneration means uniformly placed within the said half-round displacer member, shaft means for the said base half-rotor supported by two bearings disposed within two side plates secured to the said hot and cold housing blocks, a power rotor eccentrically disposed within the remaining said large parallel bore, multiple radial slots disposed within the said power rotor, multiple slidable power vanes disposed within the said multiple radial slots, output shaft means supporting said power rotor, bearing means supporting said output shaft disposed within the said two side plates, multiple parallel cooling bores uniformly disposed within the said cold housing block, multiple parallel photo bores uniformly disposed in the end of the said hot housing block, multiple sealed lens assemblies disposed within each of the said photo bores, multiple high intensity light sources for the said photo bores, means to focus the said light sources with the lens assemblies onto the said base half-rotor.

2. A pressurized gas rotary Stirling cycle engine according to claim 1, including multiple, circular regenerator bores uniformly disposed within the said base half-rotor, peripheral slots communicating with the said multiple circular regenerator bores, curved glass segments secured in grooves above the said peripheral slots, entrance and exit slots disposed within the said near half-round displacer member in communication with the said circular regenerator bores within the said base half-rotor, fine mesh metallic filament uniformly disposed within the said multiple, circular regenerator bores.

3. A pressurized gas rotary Stirling cycle engine according to claim 1, wherein the high intensity light sources comprise multiple fuel burners and mantles disposed in-line with the said photo bores, multiple reflectors are disposed behind each fuel burner in-line with the said photo bores, and fuel storage and delivery means are provided for the said multiple fuel burners.

4. A pressurized gas rotary Stirling cycle engine according to claim 1 in which the said shaft means outside of the engine blocks are each provided with large spur gears, a third spur gear meshes with the two said spur gears and is supported by an idler shaft mounted on the said engine blocks, a cover disposed over the gear assembly and secured to the said engine block.

5. A pressurized gas rotary Stirling cycle engine according to claim 1 wherein the high intensity light sources comprise multiple electric projection lamps, electricity supply and control means provided for each of the said multiple electric projection lamps, housing means for the said multiple electric projection lamps, and ventilation means disposed within the said housing means.

6. A pressurized gas rotary Stirling cycle engine according to claim 1, in which the said multiple slidable power vanes are provided with rectangular half-lapped sealing elements which are closely fitted into the corresponding slots within the ends and sides of the said multiple slidable vanes, the said two large parallel bores are provided with baked-on dry film lubrication, and the said sealing elements are treated with permanent dry film lubricant.

7. A pressurized gas rotary Stirling cycle engine according to claim 1, including a multiple finned cooling member secured to the exposed side of the said cold housing block, two coolant manifolds disposed over each side of the said cold housing block, and sealing means are disposed between the said two coolant manifolds and the said cold housing block.

8. A pressurized gas rotary Stirling cycle engine according to claim 1, including multiple burner nozzles uniformly disposed in closed proximity with the end of the said hot housing block, and fuel storage and delivery means provided for the said multiple burner nozzles.

9. A pressurized gas rotary Stirling cycle engine according to claim 1 including a light-interrupting half-disc disposed between the said high-intensity light sources and the said hot housing block, and gearing means to couple the said light-interrupting half-disc to the said shaft means with a one-to-one ratio.

10. A pressurized gas rotary Stirling cycle engine according to claim 1, including one or more curved displacer vanes in pivoting association with the said near half-round displacer member, and anti-friction bearing means disposed along the ends of the said near half-round displacer member.

References Cited

UNITED STATES PATENTS

| | | | |
|---|---|---|---|
| 3,370,418 | 2/1968 | Kelly | 60—24 |
| 3,426,525 | 2/1969 | Rubin | 60—24 |

FOREIGN PATENTS

| | | |
|---|---|---|
| 757,746 | 10/1933 | France. |
| 962,996 | 12/1949 | France. |
| 1,528,939 | 5/1968 | France. |

MARTIN P. SCHWADRON, Primary Examiner

R. BUNEVICH, Assistant Examiner

U.S. Cl. X.R.

62—6